INVENTOR
Gustav A. H. Kellner
BY
his ATTORNEYS

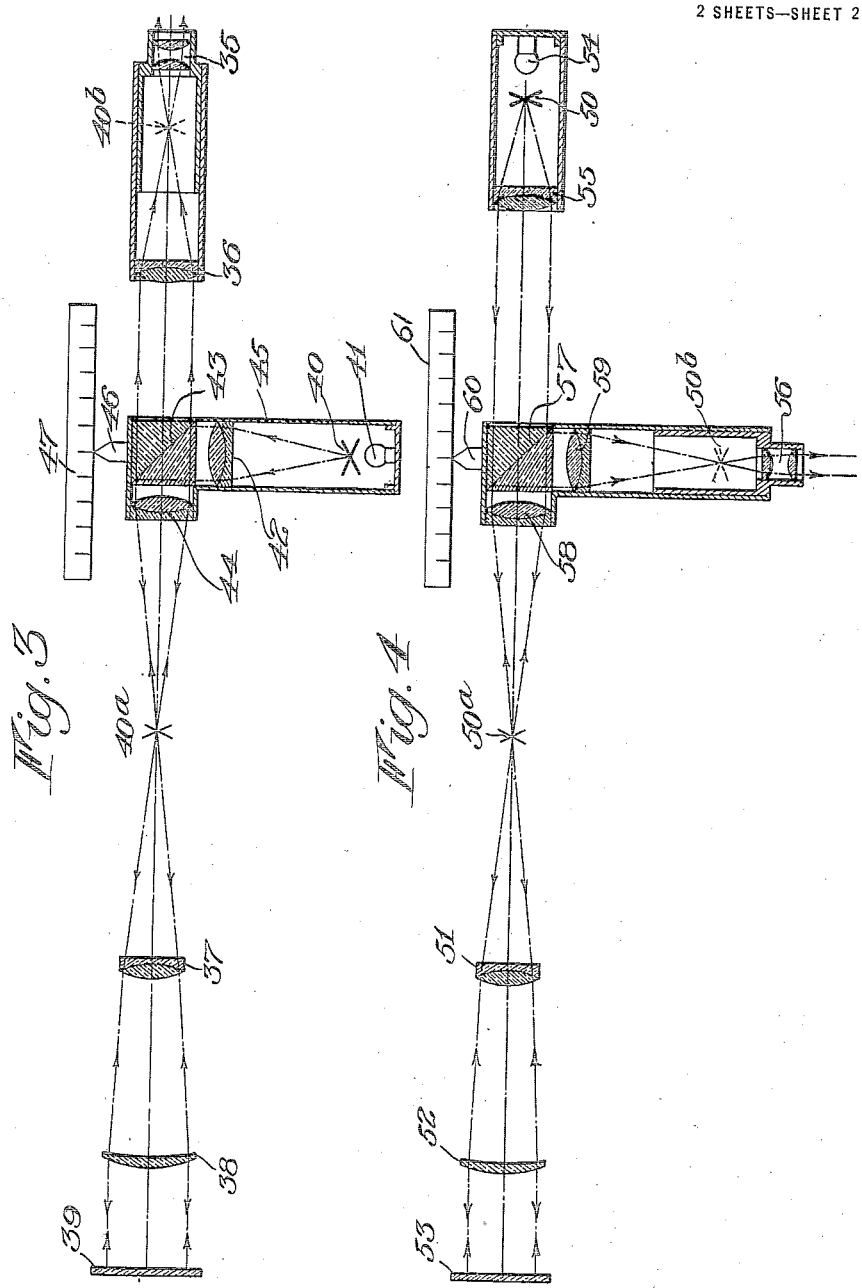

UNITED STATES PATENT OFFICE.

GUSTAV A. H. KELLNER, OF ROCHESTER, NEW YORK, ASSIGNOR TO BAUSCH & LOMB OPTICAL COMPANY, OF ROCHESTER, NEW YORK, A CORPORATION OF NEW YORK.

LENS-MEASURING INSTRUMENT.

1,309,359. Specification of Letters Patent. Patented July 8, 1919.

Application filed December 9, 1916. Serial No. 135,942.

*To all whom it may concern:*

Be it known that I, GUSTAV A. H. KELLNER, of Rochester, county of Monroe, and State of New York, have invented certain new and useful Improvements in Lens-Measuring Instruments; and I do hereby declare the following to be a full, clear, and exact description of the same, reference being had to the accompanying drawings, forming a part of this specification, and to the reference-numerals marked thereon.

My present invention has for its object to provide an instrument for measuring lenses, particularly such lenses as are used in eye-glasses and spectacles, whereby their power in diopters, and fractions thereof, may be readily ascertained. My invention described generally comprises the combined use of a target with a standard lens and one or more reflectors so disposed that the image of the target will be formed at a point in front of the lens to be measured; *i. e.* on the same side of the lens to be measured as is the target itself, where said image may be observed by a suitable ocular. To these and other ends the invention consists in certain improvements and combinations of parts, all as will be hereinafter pointed out in the claims at the end of the specification.

In the drawings:

Figs. 3 and 4 are diagrammatic views, the first showing the eye-piece fixed and the target adjustable, while in the second the target is fixed and the eye-piece is adjustable.

Similar reference numerals throughout the several drawings indicate similar parts.

Ophthalmic lenses are designed to correct abnormalities of the eye and are ground and polished to provide surfaces of proper curvature to produce refractions equivalent to the focal length, or power, and of the same value as the test, or trial lens, or lenses, employed by the optometrist in making the necessary test of a patient's eye, in order to prescribe lenses of the requisite power. It is, of course, important to the patient that a given lens, which may represent the combined effects produced by two or more test lenses, be made with the utmost accuracy, and when worn in front of the eye shall have a power equivalent to the combined values of the test lenses, and the purpose of my invention is to provide an instrument which will measure a lens under the same refracting conditions occurring when it is in position in front of the eye of the patient. Stated generally, my invention comprehends the use of a reflector and a target, so disposed with reference to each other and to a standard, or positive lens, used in conjunction therewith, that the rays of light passing therethrough and through the lens to be tested are redirected and the image of the target formed by the redirected light rays falls in such a position that it may be viewed in a suitable eye-piece.

Figure 1:
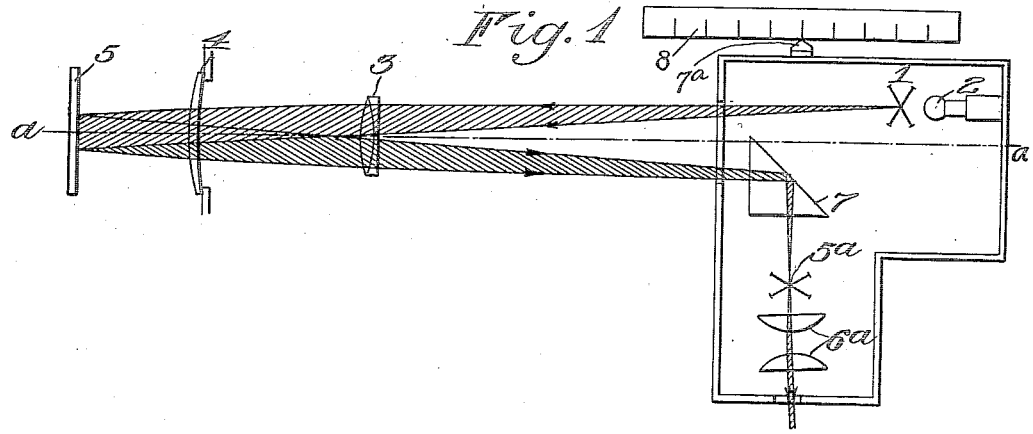
Figure 1 is a diagrammatic illustration showing an arrangement of optical elements disclosing one embodiment of my present invention.

The principle of redirecting the light rays is illustrated generically in Fig. 1, in which the rays of light from the target 1, illuminated by the lamp 2, pass through a standard, or positive lens 3, and the lens to be tested, indicated by 4 and impinge upon the reflector 5. The light rays which are turned back retrace their original path through the lenses 4 and 3. If desired the redirected rays may be intercepted by a reflecting surface 7 and directed laterally to form the image at the point 5ª, where it may be viewed by an eye-piece composed of the lenses 6ª. In this arrangement of parts, the target 1 and the ocular 6ª, would be adjustable. In this arrangement of parts the target 1 is located in the focal plane of the standard lens 3, but is displaced slightly at one side of the common axis of the standard lens and the lens to be measured, so that the image of said target is disposed at the opposite side of such axis. A pointer 7ª mounted to move with the target may coöperate with a fixed scale 8 graduated to indicate in diopters the power of the lenses tested.

In other forms of the instrument illustrated in the succeeding figures of the drawings I have shown a transparent reflector located in said axis of the two lenses (the standard lens and lens to be tested) which in one arrangement of parts intercepts the redirected rays and deflects them laterally, and in another disposition of the target and eye-piece deflects the light rays from the target into said lens axis, the transparent reflector permitting the redirected rays to enter the eye-piece.

Figure 2:
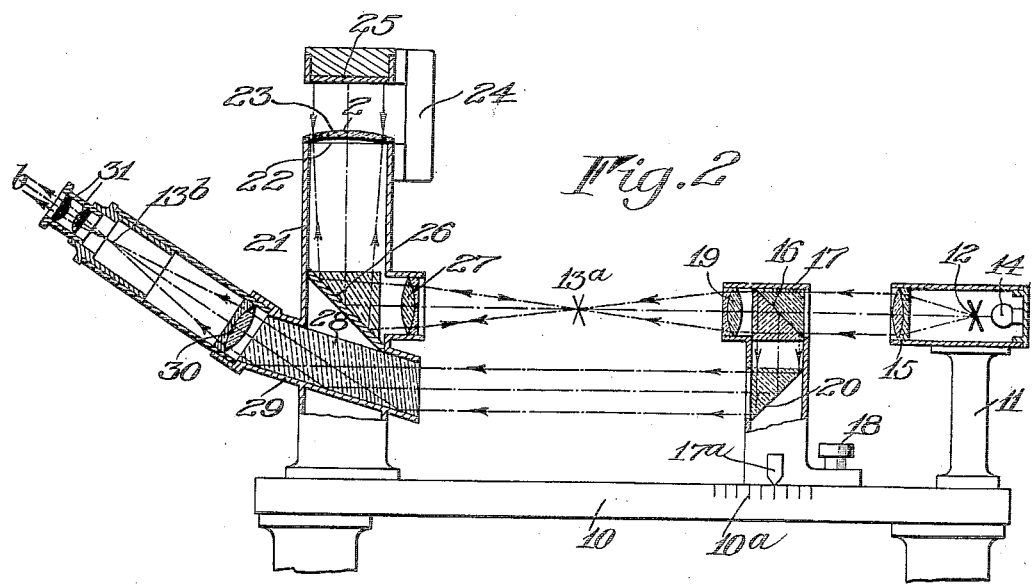
Fig. 2 illustrates an arrangement of parts in which the eye-piece is fixed and located at one end of the instrument, while the target is disposed at the other.

In Fig. 2 an instrument is shown comprising a base or bed 10, carrying at one end an upright 11 supporting a horizontal tube containing a target 12, which is illuminated by a lamp 14, and a lens 15 for paralleling the rays of light from the target and directing them forwardly. Situated in the path of these light rays is a transparent reflecting surface 16 supported in a suitable housing 17 which is movable longitudinally on the bed 10 by means of adjusting screw 18. The reflecting surface 16 may be made in several different ways, but I prefer to use a prism having a lightly silvered surface, known as a washed surface, which permits the passage of light rays therethrough and serves to deflect a portion of them. Arranged in horizontal alinement with the surface 16 is a focusing lens 19 and vertically disposed beneath said surface is a prismatic reflector 20. Spaced from the support 17 and fixed at the end of the bed 10 is a column 21 the upper end 22 of which forms a support for the lens to be tested, indicated at 23, and above the latter and held upon the arm 24 is the reflecting surface 25. Within the column and beneath the seat 22 is a reflector 26, in alinement with the surface 16 and lens 19, and in front of said reflector 26 is a standard, or positive lens 27. Beneath these last mentioned parts and also supported on the column 21 is a prism 28, the lower surface 29 of which receives light rays from the reflector 20 on the standard 17 and directs them rearwardly and upwardly through a focusing lens 30 and the lenses comprising the ocular 31.

It will be seen from the arrangement of parts disclosed in Fig. 2 that light rays from the target 12 after passing through the lens to be measured, are reflected by the surface 25 along the path traversed by them in reaching said reflector and by the combined action of this lens and the standard lens 27 the image of the target 12 will be formed at the point 13ª, or substantially midway between the standard lens and the focusing lens 19. The redirected rays again falling upon the lens 19 are rendered parallel by it and impinging upon the surface 16 are reflected to the surface 20, thence to the surface 29 and into the lens 30, which converges the rays to reproduce the image of the target at the point 13ᵇ in front of the eye-piece lenses 31. With the interposition of lenses of different curvature on the support 22 the point at which the target image 13ª is formed will move closer to or farther away from the standard lens 27, and in order to render the reproduction of this image at the point 13ᵇ necessitates a corresponding adjustment of the focusing lens 19. This movement I utilize in order to measure the power of various lenses by providing upon the base 10 suitable graduations 10ª with which the pointer 17ª coöperates. The graduations of the scale are preferably of such size and so spaced as to indicate in diopters the refractive power of lenses placed upon support 22.

In Figs. 3 and 4 I have shown a modified arrangement of the parts, the only difference between the two structures being in the reversing of the position of the eye-piece and target. In the former the eye-piece is stationary, while the target, focusing lens and the reflector are adjustable, and in Fig. 4 the target is stationary and the eye-piece is positioned so that it is adjustable toward and from the standard lens.

The parts of the instrument, disposed as shown in Fig. 3, comprise the ocular 35 in alinement with a focusing lens 36 located in the axis of the standard, or positive lens 37, and the lens to be tested, indicated by 38, which latter is interposed between the lens 37 and the reflector 39. The target of this instrument is located at 40 and is illuminated by lamp 41, the light rays of which passing through the target are collected by the lens 42 from which they are received on the transparent reflecting surface 43 and are redirected through the focusing lens 44 into the standard lens 37. From this arrangement of parts it will be seen that the light rays passing from the target 40, impinge against the surface 39 and by it are reflected back through the lens to be tested, 38, and the standard lens 37 the combined effect of which will cause the image of said target to be focused, as indicated at 40ª. Now if the target and the lens 44 are adjusted relatively to the lens 37 the image 40ª may be reformed at the point 40ᵇ, where it can be observed by the ocular 35. It will be understood that the instrument embodying this arrangement of the parts will comprise suitable supports for the various lenses and that the target with its lamp, the lenses 42 and 44, and the reflecting surface 43, will be contained in a suitable longitudinal adjustable housing 45, the movement of which will be indicated by the coöperation of a suitable index, or pointer 46, with a scale 47.

In Fig. 4 the target, indicated by 50, is arranged in the axis common to the standard, or positive lens 51 and the lens to be tested, indicated by 52, and beyond the latter is the reflector 53. The target is illuminated by a suitable lamp 54 and the light rays therefrom are rendered parallel by the lens 55. In this instrument the redirected light rays are received in the eye-piece 56 into which they are diverted by means of a transparent reflector 57 in horizontal and vertical alinement with which are the focusing lenses 58 and 59. In an instrument in which the parts are located in the manner shown in Fig. 4 the light rays, after leaving the lens 55, pass through the reflector 57, emerge from the lens 58 and traverse the lenses 51 and 52 are received upon and redirected over the same path by the reflector 53. The combined action of the standard lens 51 and the lens to be tested, 52, causes the image of the target 50 to be formed at the point indicated by 50ᵃ, and when the lens 58 with the reflector 57 is properly adjusted with reference to said image the latter will become visible in front of the eye-piece 56, as indicated at 50ᵇ. The adjustment of the last mentioned part relatively to the fixed point occupied by the standard lens 51 will be indicated on scale-bar 61 by means of a suitable index, or pointer 60.

In the various forms of instruments shown for carrying out my invention I utilize the principle of forming the image of the target on the same side of the standard lens as the target itself, and utilize as elements the target, the positive lens and the reflector, arranged in spaced relation, and between the last two elements I provide a fixed seat, or support, for the lens to be tested. By utilizing a second transparent reflector disposed in the axis of the instrument it is possible to locate the eye-piece of the instrument and the target otherwise than in axial alinement.

I claim as my invention:

1. A lens testing apparatus comprising a target, a positive lens and a reflector arranged in spaced relation and means forming an image of the target in front of the positive lens, means for supporting a lens to be tested between the latter and the reflector, and a second reflector between the target and its image directing the reflection of the target image laterally of the axis of the lens system and means for viewing the reflected image.

2. A lens testing apparatus comprising a target, a positive lens, and a reflector arranged axially in the order named, a lens for forming an image of the target, adjustable along said axis, and a second reflector between the target and the said image forming lens and means at one side of the axis of the lenses for viewing the reflected image.

3. A lens testing apparatus comprising a target, a lens for forming an image of the target, a positive lens adapted to coöperate with a lens to be tested to render light rays of the target image parallel, a reflector receiving said rays and redirecting them, and a second reflector receiving the redirected rays and reflecting the image formed by them laterally.

4. A lens testing apparatus comprising a target, a lens for forming an image of the target, a positive lens adapted to coöperate with a lens to be tested to render light rays of the target image parallel, a reflector receiving said rays and redirecting them, and a second transparent reflector receiving the redirected rays and reflecting the image formed by them laterally, and a lens system for viewing the image reflected by the second reflector.

5. A lens testing apparatus comprising a standard lens adapted to coöperate with a lens to be tested to render parallel light rays passing through them, a reflector for redirecting the parallel light rays, a target, a lens system for forming an image thereof, an observing telescope for viewing said image and a transparent reflector said parts being so positioned with relation to each other and to the standard lens that the image of the target is positioned at the focal point of the combined standard lens and lens to be tested, and the reflection thereof formed by the redirected light rays is received in the telescope.

6. A lens testing apparatus comprising a standard lens adapted to coöperate with a lens to be measured to render parallel the light rays passing through them, a reflector receiving said light rays and redirecting them, a transparent reflector located in the axis of said lens and adjustable longitudinally thereof, a target and a lens system for forming an image of the target and means for focalizing and observing light rays redirected by the first mentioned reflector, said target and focalizing means being arranged one in alinement with the standard lens and the other at an angle thereto in alinement with the transparent reflector.

7. A lens testing apparatus comprising a standard lens adapted to coöperate with a lens to be tested and a reflector for redirecting through said lenses the light rays received therefrom, a target and a lens system for forming an image thereof embodying an adjustable part for positioning said image in the focal point of the combined standard lens and lens to be tested, a transparent reflector interposed in the target lens system and means for focalizing and observing the image formed by light rays reflected by the transparent reflector.

GUSTAV A. H. KELLNER.